United States Patent [19]

Hilscher et al.

[11] 4,383,925

[45] May 17, 1983

[54] FILTERS

[75] Inventors: Eduard Hilscher, Idstein; Karl-Heinz Ott, Kelkheim; Rüdiger L. von Reppert, Wiesbaden, all of Fed. Rep. of Germany

[73] Assignee: Hoechst Aktiengesellschaft, Frankfurt am Main, Fed. Rep. of Germany

[21] Appl. No.: 329,128

[22] Filed: Dec. 9, 1981

Related U.S. Application Data

[63] Continuation of Ser. No. 155,587, Jun. 2, 1980, which is a continuation of Ser. No. 788,322, Apr. 18, 1977, abandoned, which is a continuation of Ser. No. 716,970, Aug. 23, 1976, abandoned, which is a continuation of Ser. No. 519,414, Oct. 31, 1974, abandoned.

[30] Foreign Application Priority Data

Nov. 2, 1973 [DE] Fed. Rep. of Germany ....... 2354917

[51] Int. Cl.³ ........................... C02F 1/40; C02F 1/56
[52] U.S. Cl. .................................. 210/708; 210/723; 210/734; 210/702; 210/489
[58] Field of Search ................ 210/702, 708, 723–729, 210/732–734, 767, 489, 490, 491, 499, 507–509

[56] References Cited

U.S. PATENT DOCUMENTS

| | | | |
|---|---|---|---|
| 2,241,641 | 5/1961 | Magill | 210/723 |
| 2,300,693 | 11/1942 | Oswald | 210/702 |
| 2,355,882 | 8/1944 | Rugeley | 210/490 |
| 2,378,323 | 6/1945 | Pomeroy | 210/723 |
| 3,016,345 | 1/1962 | Price | 210/708 |
| 3,094,763 | 6/1963 | Mizell | 139/383 A |
| 3,171,800 | 3/1965 | Rice | 210/723 |
| 3,210,229 | 10/1965 | Feine | 210/489 |
| 3,450,632 | 6/1969 | Olson | 210/806 |
| 3,473,576 | 10/1969 | Amneus | 210/499 |
| 3,502,116 | 3/1970 | Grawford | 210/499 |
| 3,543,940 | 8/1968 | Schmidt | 210/490 |
| 3,617,569 | 5/1941 | Daniels | 210/723 |
| 3,636,150 | 1/1972 | Rowley | 210/490 |
| 3,675,776 | 7/1972 | Campo | 210/489 |
| 3,691,086 | 9/1972 | Lees | 210/723 |
| 3,756,959 | 9/1973 | Vitalis | 210/708 |
| 3,798,160 | 3/1974 | Huffman | 210/729 |
| 3,817,861 | 6/1974 | Slusarczuk | 210/723 |
| 3,850,203 | 11/1974 | Shobert | 210/490 |
| 3,872,000 | 3/1975 | Hamada | 210/729 |
| 3,928,195 | 12/1975 | Hoeltgen | 210/723 |

FOREIGN PATENT DOCUMENTS

| | | | |
|---|---|---|---|
| 215787 | 6/1956 | Australia | 210/723 |
| 1231288 | 8/1968 | United Kingdom | 210/723 |

OTHER PUBLICATIONS

Hackh's Chemical Dictionary, Fourth Edition, Grant, McGraw-Hill Book Co., 1969, 1972, 534.
Man Made Textile Encyclopedia, Textile Book Publishers, Inc., London, 1959, 320–322, 494–496.
The American College Dictionary, Random House 1970, p. 444.
Hackh's Chemical Dictionary, McGraw-Hill Book, N.Y., 1969, 536 & 610.
Encyclopedia of Polymer Science and Technology, vol. 4, 1966, p. 26.

*Primary Examiner*—Ernest G. Therkorn
*Attorney, Agent, or Firm*—Hammond & Littell, Weissenberger and Muserlian

[57] ABSTRACT

A filter device suitable for filtering sludges which comprises (A) a tube-like filter as an outer wall consisting of a fabric of polyester or polyamide filament yarn which acts as a support for (B) an inner layer consisting of a non-woven fabric of man-made fibres and a process of dewatering industrial sludge.

7 Claims, No Drawings

FILTERS

PRIOR APPLICATION

This application is a continuation of our copending U.S. patent application Ser. No. 155,587 filed June 2, 1980 which in turn is a continuation of application Ser. No. 788,322 filed Apr. 18, 1977 now abandoned, which in turn is a continuation of application Ser. No. 716,970 filed Aug. 23, 1976, now abandoned, which in turn is a continuation of application Ser. No. 519,414 filed Oct. 31, 1974, now abandoned.

This invention relates to filters and to a method of dewatering sludges.

Filter devices made of synthetic fabrics are known which may be used to dewater clarified, flocculated sludges under the effect of gravity. Fabrics made, for example, from high tensile strength polyethylene terephthalate fabrics have been used for this purpose. Industrial sludges generally have a small particle size however and such filters have often been found unsuitable for the dewatering thereof. It is found that either the solid particles pass through the filter, or, if the pore size of the filter is reduced, the dewatering efficiency (dewatering capacity per unit time) thereof becomes so low as to be impractical.

However, according to the present invention we provide a filter device suitable for filtering sludges, including industrial sludges, which comprises a filter devic suitable for filtering sludges which comprises (A) a tube-like filter as an outer wall consisting of a fabric of polyester or polyamide filament yarn which acts as a support for (B) an inner layer consisting of a non-woven fabric of man-made fibre.

The inner layer (B) is made of a non-woven fabric such as, for example, needle felt or spun fleece. Particularly preferred non-woven fabrics are needle felts of polyamide (for example polycaprolactam, polyhexamethylene adipate, polyhexamethylene sebacate and polyundecenoamide), polyester (for example polyethylene terephthalate, poly-1,4-dimethylolcyclohexane terephthalate and the corresponding isophthalates), polyacrylonitrile (including copolymers of acrylonitrile and at least one copolymerisable monomer, the acrylonitrile content of the said copolymer being at least 85%), polyolefin (for example polyethylene and polypropylene) fibres and also spun-bondeds of polyamide, polyester and polyolefin fibres, for example the above mentioned.

The support of the filter provides the outer wall of the filter and serves primarily as a supporting and reinforcing member. It is designed to take the weight of the filter load and is thus made of high tensile-strength polyester or polyamide fibres, for example polycaprolactam, polyhexamethylene adipate, poly-p-phenylene terephthalamide or polyethylene terephthalate fibres.

Preferably the woven fabric from which the support is made has a fairly open warp and weft thread setting since with too close a thread setting the dewatering efficiency of the filter can fall sharply. Thus, for example, with a fibre thickness of about dtex 2200, a warp and weft thread setting of from 7.8 to 9.2, preferably 8.2 to 8.8 threads per cm, is suitable. With a different fibre thickness the thread setting should be altered correspondingly. For polyamide fabrics the optimum thread settings may be determined by the expert relatively simply taking into consideration the expansion characteristics of the polyamide fibre. In this respect it may be observed that the support is not required to perform the function of a filter; the inner layer (B) assumes this function.

The non-woven fabric serves to separate the sludge to be filtered into a solids part and a liquid filtrate. In practice it is advantageous for the inner layer (B) and the support casing not to be mechanically connected to each other, since then the non-woven fabric may be used once and then replaced. The filter device according to the invention is suitable for the dewatering of all sludges, especially industrial sludges. Particular applications for which the filter has been designed however are for the treatment of sludges produced in the ceramics industry e.g. in the field of fine pottery, in the manufacture of plate glass or in the grinding of the same (e.g. for the purification of latex-containing waste water and other waste waters), in smelting plants (e.g. $Fe_2O_3$ sludges), in metal treating plants (e.g. for the treatment of neutralising water from steel pickling plants and electrolytic sludges from pickling plants, electrolysing plants, chromium-plating plants and nickel-plating plants), in the chipboard and wood-fibre board industry, in the paper industry (e.g. paper sludge), in the food industry (e.g. in the sugar industry, in vegetable canning plants, in wine-pressing plants), in abbatoirs (e.g. in the rumen washing water), in the dairy-products industry in the flocculating of whey, and in brewing, distilling and other yeast fermentation processes.

According to a further feature of the invention there is provided a method of dewatering a sludge (e.g. an industrial sludge) which comprises filtering the sludge by means of a filter device according to the invention.

The size of the solid particles in the sludge may be sufficiently large as to allow filtration of the sludge without prior treatment. If, on the other hand, the solid particles are very small or are in suspension, the sludge is then preferably first treated with a cation- or anion-active flocculating agent, for example with a polyacrylamide, a polymeric phosphate, ferric chloride, iron or aluminium sulphate, lime or crude phosphate. If the solid particles in the sludge are in emulsion then it is generally necessary to coagulate the emulsion by addition of a coagulating agent, for example an acid, a polysilicate or an electrolyte. The emulsion, for example a cutting oil, cutting or separating emulsion, is converted into a filterable form by coagulation in known manner and is then preferably further treated with a flocculating agent. The solids in the treated sludge are then separated from the liquid phase by means of a filter according to the invention.

The following Examples serve to illustrate the claimed features of the invention.

EXAMPLE 1

A galvanic sludge from a pickling plant with a solids content of 3.8% by weight in the form of fine to very fine particles, was passed through a combination filter comprising a spun-bonded material of polyethylene terephthalate and a support made of a fabric woven from high-tensile strength fibres of polyethylene terephthalate, the fibres having a thickness of dtex 2200 and a thread setting of 8.5 fibres per cm. The solids content of the sludge was thereby separated from the liquid. After about 15 minutes, approximately 87% of the sludge suspension put in had passed through the filter. The sludge retained in the filter contained 30.5% by weight solids.

EXAMPLE 2

A cutting oil waste emulsion was treated with 1.25% by weight (based on the mixture) of an emulsion-destabilising agent in general commercial use based on a polysilicate, and afterwards the mixture was treated with 0.005% by weight of a cation-active polyacrylamide flocculating agent. The precipitate thus obtained could satisfactorily be separated from the liquid by means of the combination filter described in Example 1.

What we claim is:

1. In a process of dewatering industrial sludge selected from the group consisting of
   (a) a sludge with an addition of a flocculating agent selected from the group consisting of polyacrylamide, polymeric phosphates, aluminum sulfate, lime and crude phosphate prior to dewatering,
   (b) sludge coagulated from an emulsion by addition of a coagulating agent and
   (c) sludge coagulated from an emulsion by addition of a coagulating agent and then flocculated with one of said flocculating agents prior to dewatering, the improvement comprising filtering the said sludge through a filter device comprised of a (A) tube-like outer filter layer consisting of a woven fabric of a polyester or polyamide filament yarn acting as a support for (B) a tube-like inner layer made of a non-woven fabric of polyester, polyamide or polyolefin fibers, the warp and weft thread setting being 7.8 to 9.2 threads per cm with the thread settings altering dependent on different fiber thickness.

2. A process as claim in claim 1 wherein the sludge is selected from the group consisting of sludges from ceramic industry, plate glass industry, smelting plants, metal treatment plants, chip board and wood-fiber board industry, paper industry and coagulated cutting oil, coagulated cutting or separating emulsion and wherein the flocculating agent is that specified in claim 1 or ferric chloride or ferric sulfate.

3. A process as claimed in claim 1 wherein the coagulating agent for the treatment of the emulsion is an emulsion-destabilizing agent.

4. A process as claimed in claim 3 wherein the emulsion-destabilizing agent is based on a polysilicate.

5. A process as claimed in claim 1 wherein the dewatering of sludge is effected with an inner layer (B) which is made of needle-felt or spun-bondeds.

6. A process as claimed in claim 1 wherein the dewatering is effected by means of a tube-like filter (A) acting as a support for (B) wherein the fibres of the woven fabric of (A) have a thickness of about dtex 2200.

7. A process as claimed in claim 1 wherein the inner layer (B) is loosely arranged in the support (A).

* * * * *